(12) United States Patent
Boltovets et al.

(10) Patent No.: US 7,324,039 B2
(45) Date of Patent: Jan. 29, 2008

(54) SHORT-RANGE AUTOMOTIVE RADAR TRANSCEIVER

(75) Inventors: Nikolai S. Boltovets, Kiev (UA);
Vladimir V. Basanets, Kiev (UA);
Aleksander V. Zorenko, Kiev (UA);
Sergei B. Maltsev, Kiev (UA);
Anatoliy F. Odnolko, Kiev (UA);
Vasilii I. Rudyk, Kiev (UA); Dmitrii V. Sobolev, Kiev (UA); Serguei D. Shevchuk, Kiev (UA); Alexander S. Markov, Kiev (UA); Iryna A. Maltseva, Kiev (UA); Andrei V. Pavlyuchenko, Kiev (UA); Vladimir P. Rukin, Kiev (UA); Sergei V. Makovenko, Kiev (UA); David S. Breed, Boonton Township, Morris County, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 17 days.

(21) Appl. No.: 11/304,502

(22) Filed: Dec. 15, 2005

(65) Prior Publication Data
US 2006/0132350 A1 Jun. 22, 2006

Related U.S. Application Data

(60) Provisional application No. 60/636,574, filed on Dec. 16, 2004.

(51) Int. Cl.
*G01S 13/93* (2006.01)
*G01S 7/28* (2006.01)
(52) U.S. Cl. ............... 342/70; 342/71; 342/72; 342/128; 342/175; 340/903; 340/435; 340/436
(58) Field of Classification Search ............ 342/70–72, 342/128–135, 175; 340/903, 435, 436; 701/301
See application file for complete search history.

(56) References Cited

U.S. PATENT DOCUMENTS 3,789,302 A * 1/1974 Rearwin et al. ............ 455/111

(Continued)

FOREIGN PATENT DOCUMENTS

RU 2072623 C1 1/1997

OTHER PUBLICATIONS

Uematsu Hiroshi, Voltage-Controlled Oscillator and FMCW Radar, abstract of JP10197625, Jul. 31, 1998.

*Primary Examiner*—John B. Sotomayor
(74) *Attorney, Agent, or Firm*—Brian Roffe

(57) ABSTRACT

Automotive vehicle including a radar transceiver each including a heterodyne active IMPATT multiplier module arranged to receive a signal from a VCO, a first balance mixer arranged to receive a signal from a VCO, a second balance mixer arranged to receive a signal from a receive antenna and the IMPATT multiplier module and derive a first intermediate frequency signal, a first amplifier for amplifying the output of the second balance mixer and providing the amplifier output to the first balance mixer, and a second amplifier for amplifying the output of the first balance mixer. The vehicle also includes a processor which receives output from the second amplifier of each transceiver and generates a control signal for controlling one or more vehicular components based on the output from the second amplifier(s). The components can be part of a collision avoidance system, blind spot monitoring system and the like.

20 Claims, 8 Drawing Sheets

U.S. PATENT DOCUMENTS

| | | | |
|---|---|---|---|
| 3,882,424 A * | 5/1975 | Debois et al. .............. 332/127 |
| 4,541,120 A * | 9/1985 | Szabo ........................ 455/86 |
| 4,636,758 A | 1/1987 | Mettoudi |
| 4,660,006 A | 4/1987 | Tajima et al. |
| 4,857,935 A * | 8/1989 | Bates ........................ 342/128 |
| 4,931,799 A | 6/1990 | Wen et al. |
| 5,127,102 A * | 6/1992 | Russell ...................... 455/327 |
| 5,184,136 A * | 2/1993 | Cardiasmenos ............ 342/153 |
| 5,422,613 A | 6/1995 | Nativ |
| 5,497,163 A * | 3/1996 | Lohninger et al. .......... 342/175 |
| 5,512,901 A * | 4/1996 | Chen et al. .................. 342/175 |
| 6,438,365 B1* | 8/2002 | Balteanu ..................... 455/326 |
| 6,535,072 B2 | 3/2003 | Yamashita et al. |
| 7,095,366 B2* | 8/2006 | Kato et al. .................. 342/175 |
| 2005/0099248 A1 | 5/2005 | Maltsev et al. |
| 2006/0132350 A1* | 6/2006 | Boltovets et al. ............. 342/70 |

\* cited by examiner

SHORT-RANGE AUTOMOTIVE RADAR TRANSCEIVER

CROSS REFERENCE TO RELATED APPLICATION

This application claims priority under 35 U.S.C. §119(e) of U.S. provisional patent application Ser. No. 60/636,574 filed Dec. 16, 2004, which is incorporated by reference herein.

BACKGROUND OF THE INVENTION

1. Field of the Invention

This invention relates in general to short-range radars, and in particular, to transceivers of automotive radars of the Precise Positioning System (PPS) which is intended to be a constituent of the Intelligent Vehicle Initiative (IVI) of the U.S. government. Once realized, this system will provide a determination of a safe and precise location of a vehicle in a traffic lane on the road, prevent traffic accidents when the vehicle is exiting the roadway and otherwise reduce the likelihood of traffic accidents. The automotive radars serve as sensors of the PPS that provide its secure and efficient round-the-clock functioning under any weather conditions.

2. Description of the Prior Art

A crucial section of an automotive millimeter-wave (MM-wave) radar sensor is a transceiver front-end whose key element is a source of electromagnetic radiation (EMR). The most significant requirements for it are the levels of phase noise and power output. Their required values are obtained, with minimal over-all dimensions and costs, in the transceiver circuit of continuous wave radar with linear frequency modulation (FMCW radar).

When choosing the final construction of the on-board radar front-end, the purpose-oriented criterion (from the viewpoint of mass production profitability) should be maximal simplicity of the circuit at a level of operating characteristics required for a particular application. At present, it is the Gunn diode (GD) oscillators (whose frequency is stabilized with a high-Q cavity resonator) that meet most completely the set of requirements for EMR sources of on-board radars operating in the 76-77 GHz frequency range. In actual front-ends, the frequency-setting elements are voltage controlled oscillators (VCO) with indium phosphide [see, D. D. Li, S. C. Luo, C. Pero, X. Wu and R. M. Knox, Millimeter-wave FMCW/monopulse radar front-end for automotive applications, IEEE MTT-S Intern. Microwave Symp. Digest. 1999, vol. 1, pp. 277-280; M. E. Russell, A. Crain, A. Curren et al. Millimeter-wave radar sensor for automotive intelligent cruise control (ICC), IEEE Transactions on Microwave Theory and Techniques. 1997, vol. 45, no. 12, pp. 2444-2453] or gallium arsenide [see, L. P. Lowbridge, Low cost millimeter-wave radar systems for intelligent vehicle cruise control applications, Microwave Journal, 1995, vol. 38, no. 10, pp. 20-33] GDs operating at the fundamental (second) harmonic. The reasons for choosing GD oscillators are as follows:

there exists corresponding well-refined efficient manufacturing technology;

the power output of such diodes is quite sufficient for automotive radars;

such oscillators can be easily retuned in the required frequency range, and they have good noise characteristics.

The typical specifications of such oscillator in the frequency range of 76-77 GHz (GaAs GD) are as follows: power output of 30 mW in the electric frequency tuning band of about 1000 MHz, with phase noise value better than −85 dBc/Hz (relative to the carrier frequency level) at tuning away the carrier frequency by 100 kHz [see, L. P. Lowbridge, Low cost millimeter-wave radar systems for intelligent vehicle cruise control applications, Microwave Journal. 1995, vol. 38, no. 10, pp. 20-33]. It should be noted that, although the GD oscillators can provide the required power output and have quite satisfactory noise characteristics, the cost of assembling and tuning wave-guide diode oscillators is very high. In addition, their efficiency is low (about 2%-4%), while the volume physical structure of diodes hampers realization of transceiver construction as a planar structure.

In most modern automotive MM-wave radars, the transceivers (front-ends) are made using hybrid-integrated technology. Specifically, a parabolic or lens antenna is made with a waveguide feed, and diode (most often GD) oscillators in a cavity resonator are used as EMR source. The rest of front-end components and circuits are usually made as hybrid sections, using the elements of manufacturing technology for microstrip, coplanar or fin-lines.

At present, due to considerable advances in development of semiconductor manufacturing technology, as well as assembling and testing techniques, the following EMR sources are intensely being developed and planned for realization in the constructions of the next-generation on-board radars: MM-wave oscillators made as monolithic integrated circuits (MIC) (multi- or one-chip) on the basis of pseudomorphic high-electron-mobility transistors (PHEMTs) or heterojunction bipolar transistors (HBTs) [see, L. Raffaelli, Millimeter-wave automotive radars and related technology, IEEE MTT-S Intern. Microwave Symp. Digest. 1996, TU1B-2, pp. 35-38; I. Gresham, N. Jain, T. Budka et al., A compact manufacturable 76-77-GHz radar module for commercial ACC applications, IEEE Transactions on Microwave Theory and Techniques, 2001, vol. 49, no. 1, pp. 44-58]. However, the specifications of the present-day MICs operating in the 76-77 GHz frequency range still do not meet the imposed requirements. The problems of integration and packaging of active devices, as well as their mechanical and electric coupling with each other and the rest of transceiver components, still remain largely unsolved and potentially expensive. However, upgrading manufacturing technology and improving specifications of MM-wave MICs are being worked on. This should make it possible to apply them in the on-board radar systems of the next generation [see, I. Gresham, N. Jain, T. Budka et al., A compact manufacturable 76-77-GHz radar module for commercial ACC applications, IEEE Transactions on Microwave Theory and Techniques, 2001, vol. 49, no. 1, pp. 44-58; M. Vossiek, T. v. Kerssenbrock and P. Heide, Novel nonlinear FMCW radar for precise distance and velocity measurements. IEEE MTT-S Intern. Microwave Symp. Digest. 1998, vol. II, pp. 511-514].

In recent years, a more promising approach to the development of radar transceiver seems to be solving the problem of generating MM-wave electromagnetic oscillations at lower frequencies, with further frequency conversion into the 76-77 GHz range with frequency multipliers. Conversion of a microwave frequency-modulated signal with the required conversion characteristics (e.g., conversion range and linearity) into the MM-wave range by frequency multiplication is made without appreciable phase distortions. This makes it possible to obtain a MM-wave signal with a phase noise level essentially below that of diode and transistor active oscillators operating at the fundamental frequency. Specifically, one obtains the required level of phase noise, high temperature stability of oscillation frequency and good isolation from load (low pulling figure). In addition, the manufacturing technology for microwave components (that has been well refined in the microwave range) provides device availability and rather low cost. The inexpensive starting materials (involving also semiconductor discrete devices), as well as available and well-matured techniques for device assembling and testing at mass production, add attraction to this procedure of development and production of stable oscillators in promising MM-wave regions [see, I. Gresham, N. Jain, T. Budka et al., A compact manufacturable 76-77-GHz radar module for commercial ACC applications, IEEE Transactions on Microwave Theory and Techniques, 2001, vol. 49, no. 1, pp. 44-58].

The combination of a sufficiently high power output and acceptable conversion losses with low level of intrinsic phase noises makes frequency multipliers a very promising component in transceivers of MM-wave systems, in particular, in automotive radars. Frequency multipliers are successfully applied here in circuits where probing signals of transmitting facilities are formed, as well as in those circuits where signals of receiver local oscillators are formed. It is believed that application of frequency multipliers is especially efficient in those systems where the crucial requirement is a combination of high specifications (in particular, phase noise level), high reliability and reasonable cost [see, H. Bierman, Innovative circuit arrangements and device designs provide high performance RF and MM-wave sources for military applications, Microwave Journal, 1989, vol. 32, no. 6, pp. 26-42; D. F. Peterson, The varactor power frequency multiplier, Microwave Journal, 1990, vol. 33, no. 5, pp. 135-146.].

Among the known ways of developing diode frequency multipliers (those on the basis of nonlinear dependencies of diode reactive parameters on voltage; GD and TUNNET-diode harmonic oscillators), one should particularly note high-factor multipliers with impact avalanche transit time (IMPATT) diodes. The traditional frequency multiplication techniques are efficient at factors of about 2-3 only, at which a relatively large number of multiplication stages (and, accordingly, intermediate amplifiers) are required to provide highly efficient MM-wave EMR sources when multiplying signals from quartz-stabilized oscillators. By contrast, application of IMPATT frequency multipliers enables one to obtain a highly stable low-noise MM-wave signal using a minimal number of active elements.

The efficiency of IMPATT diode frequency multiplier has been demonstrated, both theoretically and experimentally, in the MM-wave range, because it has small conversion losses at high frequency multiplication factor. In particular, it was found that in this mode the output signal power level at the n-th harmonic is proportional to $1/n$ [see, P. A. Rolland, E. Constant, A. Derycke, J. Michel, Multiplication de frequence par diode avalanche en ondes millimetriques, Acta Electronica, 1974, vol. 17, no 4, pp. 213-228; P. A. Rolland, J. L. Waterkowski, E. Constant, G. Salmer, New modes of operation for avalanche diodes: frequency multiplication and upconversion, IEEE Trans. on Microwave Theory and Techniques, 1976, vol. MTT-24, no. 11, pp. 768-775]. This is significantly more than the attainable level for charge-storage diode multipliers where the corresponding dependence is $1/n^2$ [see, A. I. Sobolev, Yu. A. Kotov, L. A. Modestov, Superhigh-ratio frequency multipliers. In: "Semiconductor Devices and Their Application", No. 23, Sovetskoe Radio Publ. Moscow. 1970, pp. 109-132 (in Russian)].

The circuit of MM-wave automotive radar transceiver with high-factor frequency multipliers has a number of advantages over those where EMR source is an oscillator operating at the basic frequency (e.g., a GD oscillator with varactor frequency tuning [see, L. H. Eriksson, Automotive radar for adaptive cruise control and collision warning/avoidance, Radar 97, Proceedings of Radar Systems, (Conf. Publ. No. 449). 1997, pp. 16-20] or a FET oscillator [see, U.S. Pat No. 4,931,799 entitled Short-range radar transceiver employing a FET oscillator"]). In particular, the problem of highly linear frequency tuning is transferred into the microwave range where standard, available and reliable transistor VCOs are used. High linearity of these VCOs enables one to apply linearization circuits without feedback. This provides considerable reduction of the whole system cost, as well as improvement of its reliability and operating speed.

It is also known that the phase noise level is a very important parameter in many applications. Realization of EMR sources with reasonable values of this parameter (especially in the short-wave region of the MM-wave range) creates a difficult problem. Traditionally, this is achieved by introducing phase synchronization of an oscillator by a highly stable low-frequency source [see, A. D. Patsyuk, Sources of high-frequency oscillations for MM-wave systems, Zarubezhnaya Radioelektronika, 1988, no. 11, pp. 79-86 (in Russian)]. However, the number of active devices (and, as a result, the cost of the whole system) grows considerably. In addition, one should note a rather low temperature stability of the frequency of oscillators operating in that region of the MM-wave range, so that rather complex thermocompensation systems have to be applied for their reliable functioning [see, H. H. Meinel, Automotive radar and related traffic applications of millimeterwaves, 1997 Topical Symposium on Millimeter Waves, 1998, pp. 151-154].

Thus, use of such an IMPATT frequency multiplier with a high multiplication factor in a transceiver of an on-board radar enables (using a single component) transfer of a highly stable signal (formed in the microwave range) into the MM-wave range without appreciable phase distortions. Moreover, the efficiency of application of IMPATT frequency multipliers increases at their use in both the circuits of formation of transmitter probing signals and those of receiver local oscillator (LO) signals.

SUMMARY OF THE INVENTION

It is an object of the present invention to provide new and improved short-range automotive radar transceivers.

It is another object of the present invention to provide new and improved radar transceivers in which a highly stable RF signal is formed practically at any point of the MM-wave range using active IMPATT frequency multipliers with a high multiplication factor.

It is yet another object of the present invention to provide new and improved vehicular systems including short-range radar transceivers.

In order to achieve these objects and others, a radar transceiver in accordance with the invention applies active IMPATT frequency multipliers with a high multiplication factor in order to form a highly stable RF signal practically at any point of the MM-wave range. Such efficient and economical way of RF signal formation is very promising especially for radar transceiver design, because it enables one to obtain a highly stable low-noise MM-wave signal using minimal number of active elements.

This invention provides a transceiver employing active silicon IMPATT frequency multiplier modules and designed to be part of 76-77 GHz automotive FMCW short-range radar intended for application in PPS.

One of the preferred embodiments (hybrid integrated-waveguide) of an automotive radar transceiver, as provided by the present invention, involves two antennas (transmit and receive) and a receiver with a double frequency conversion circuit. Practical realization of such embodiment of transceiver showed that in this case, the extremely high level of specifications is provided at relatively low cost of radar manufacturing.

Another preferred embodiment (hybrid integrated-microstrip) of an automotive radar transceiver involves a single transmit/receive antenna with a microstrip receive/transmit circulator and a receiver with a single frequency conversion circuit. This embodiment provides a relatively small size and mass of the transceiver, and in large-scale production, it provides high reproducibility of operating parameters and low cost of automotive radars.

Unique portions of both embodiments are active IMPATT multiplier modules for the 76-77 GHz frequency range that provide high conversion efficiency at high frequency multiplication factors. A key element in the above multiplier modules is an active frequency multiplier with a silicon IMPATT diode optimized for multiplying at 76-77 GHz. It makes it possible to obtain the required power output of transceiver using a single-stage multiplication circuit. Single-stage multiplication makes the circuit much simpler and reduces the number of its elements. This results in considerable reduction of the system cost and improvement of its reliability.

Formation of a multiplying IMPATT diode optimized according to the invention for operation at frequencies of 76-77 GHz is performed within the standard manufacturing technology for silicon discrete MM-wave diodes and integrated circuits (ICs). High level and maturity of silicon technologies (those used for growing semiconductor silicon and applied in manufacturing devices from that material) makes it possible to reproducibly achieve the required parameters at MM-wave frequencies, as well as to realize them under conditions of large-scale production. This fact makes the transceiver more reliable and reduces its cost.

The circuit with a multiplying IMPATT diode proposed in the first preferred embodiment provides maximal efficiency of diode matching with both the microstrip line and waveguide transmission line. In addition, the problems of heat removal from the diode and DC bias current (that is required for IMPATT diode operation) supply are successfully solved. Such circuit enables the use of off-the-shelf discrete multiplying IMPATT diodes, thus providing easy assembling and high mechanical strength of the transmitter module as a whole.

The proposed 76-77 GHz automotive FMCW radar transceiver meets all the requirements imposed on radar transceivers for automotive applications (high transmitting power at low phase noise level of a probing signal, low noise level of receiver, mechanical strength, reliability, compactness, a possibility for large-scale production, and low cost).

The proposed transceiver differs from the known radar transceivers for similar applications in view of its highest specifications (as of transceiver power output and receiver noise), minimal number of active MM-wave components, long service life and high reproducibility of operating parameters at series production while still retaining the ability to penetrate fog, dust and smoke effectively.

An automotive vehicle in accordance with the invention includes one or more radar transceivers each including a transmit antenna, a receive antenna separate and isolated from the transmit antenna, a frequency generator for generating a voltage pulse, a voltage-controlled oscillator (VCO) arranged to receive the voltage pulse from the frequency generator and generate a signal, a transmitter active IMPATT multiplier module arranged to receive the signal from the VCO and generate a radar probing signal which is directed to the transmit antenna, a heterodyne active IMPATT multiplier module arranged to receive the signal from the VCO, a first balance mixer arranged to receive the signal from the VCO, a second balance mixer arranged to receive a signal from the receive antenna and the heterodyne active IMPATT multiplier module and derive a first intermediate frequency (IF) signal, a first amplifier for amplifying the output of the second balance mixer and providing the amplifier output to the first balance mixer, and a second amplifier for amplifying the output of the first balance mixer. The vehicle also includes a processor arranged to receive the output from the second amplifier of each transceiver and generate a control signal for controlling one or more components in the vehicle based on the output from the second amplifier(s).

For example, the component may be brakes or a steering system in which case, when the processor determines a distance between an object and the vehicle based on the output from the second amplifier(s), it controls the brakes or the steering system based on the determined distance between the object and the vehicle.

For blind spot monitoring purposes, the transceiver can be arranged to direct radar waves into a blind spot of the vehicle. One or more reactive systems is then coupled to the processor which generates a control signal to control each reactive system, e.g., to provide information to the driver about the presence of objects in the blind spot. The reactive system may be an alarm system for audibly or visually notifying the driver of the presence of a vehicle in the blind spot.

The vehicle optionally includes a database containing information about roads on which the vehicle travels. In this case, the processor is coupled to the map database and controls the component based in part on the road on which the vehicle is traveling. The vehicle also optionally includes a location determining system for determining the location of the vehicle on which the vehicle travels. As such, the processor is coupled to the location determining system and controls the component based in part on the location of the vehicle.

BRIEF DESCRIPTION OF THE DRAWINGS

These objects and features of the invention will become more fully apparent in the following description of the accompanying drawings, in which like numerals in the several views refer to the corresponding parts.

DETAILED DESCRIPTION OF THE INVENTION

Figure 1:
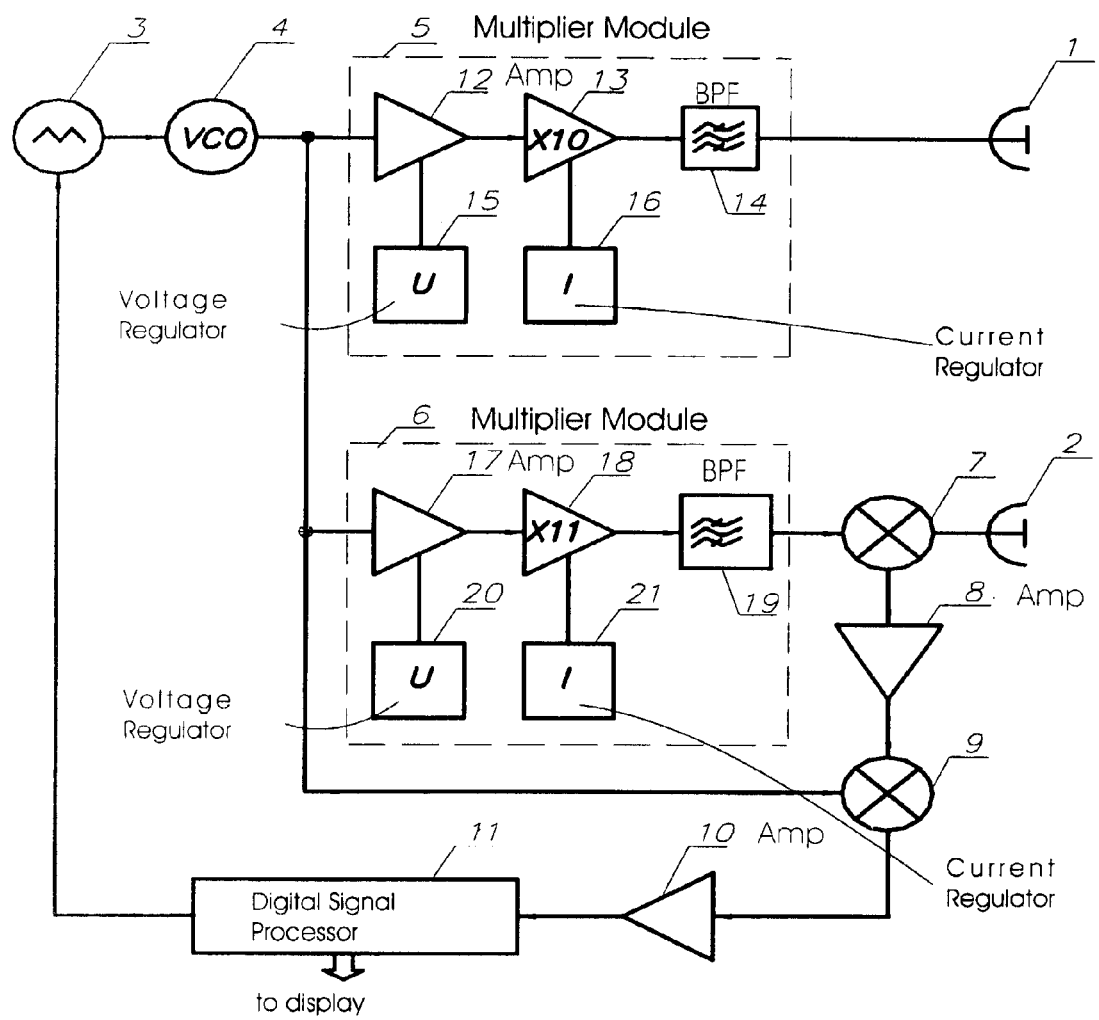
FIG. 1 shows a block diagram of the 76-77 GHz FMCW radar transceiver with two antennas according to the hybrid integrated-waveguide preferred embodiment.

1. Hybrid Integrated Waveguide Transceiver of Automotive Radar with Two Antennas 1.1 General Description of the Operation of Radar Transceiver with Two Antennas Referring first to FIG. 1, a block diagram of a transceiver operating in the 76-77 GHz frequency range in accordance with the invention is shown. One intended use of this transceiver is as a front-end of short-range FMCW automotive radar. The circuit of this transceiver involves two separate antennas—transmit antenna 1 and receive antenna 2. Use of two separate antennas, which should be adequately isolated from each other, enables a considerable increase in transceiver potential and excludes application of MM-wave isolators. The active MM-wave components of this transceiver operating at 76-77 GHz are highly efficient frequency multiplier modules with high multiplication factor implemented on silicon IMPATT diodes. The main principles of construction of this frequency multiplier over the whole MM-wave range (30-300 GHz) are disclosed in detail in the Russia Federation Patent No. 2,186,455 and U.S. patent application Ser. No. 10/473,280, incorporated by reference herein. Application of the multiplier circuit considerably improves transceiver operation stability relative to output load.

To obtain optimal results, a reasonable compromise (as to structural and technological implementation) has been found when designing the microwave elements of the transceiver. In a preferred embodiment of the present invention, all microwave elements of the frequency-setting section operating at 7.6-7.7 GHz were made as a microstrip hybrid IC; only the components operating at 76-77 GHz had a waveguide design. Although the construction realized in this invention is the complex in comparison to other versions, a transceiver construction with two separate antennas and receivers with a double frequency conversion enables one to obtain the best transceiver specifications with respect to the transmitter power output and receiver noise factor.

The transceiver operates in the following manner. A saw-tooth voltage oscillator 3 forms symmetric saw-tooth voltage of 2.048 V and provides a voltage shift within 0-8 V. The saw-tooth voltage is formed digitally. This makes it possible to provide accuracy of amplitude level setting of about 0.001%. An oscillator 3 enables one to set such a period of saw-tooth voltage that is required for measurement of parameters, and provides the required linearity of voltage variation during the whole saw-tooth period. The saw-tooth voltage is applied to the varactor control input of a transistor voltage-controlled oscillator (VCO) 4. At the VCO 4 output, a frequency-modulated (FM) signal (power of about 50 mW in the 7.6-7.7 GHz frequency range, frequency tuning non-linearity no more than 0.01%) is formed. The VCO 4 employs a bipolar transistor, which makes it possible to obtain the minimal phase noise level for an output signal. Since such a VCO implementation is well known in the art, there is no need to describe it in detail. Then, this FM signal (with high linearity of frequency tuning) is divided into three parts with a divider (not shown in FIG. 1). One part of the VCO 4 signal is directed via a first channel to the input of a transmitter active IMPATT multiplier module 5, another part of the signal is directed via a second channel to the input of a heterodyne active IMPATT multiplier module 6, and the last part of the signal is directed via a third channel to the input of a second balance mixer 9.

In this embodiment, the transceiver power source is the transmitter active frequency multiplier module 5 (multiplication factor N=10) based on a silicon IMPATT diode. The active IMPATT multiplier module 5 provides formation of a radar probing signal with power no less than 30 mW in the 76-77 GHz frequency range. The required linearity, frequency tuning rate and phase noise level for the radiated probing signal are determined by the parameters of the low-frequency VCO 4 operating at 7.6-7.7 GHz. We have determined experimentally that increase of FM noise during multiplication with such a silicon IMPATT frequency multiplier does not exceed 20 log N at about 10-100 kHz offset from the carrier. High conversion efficiency of the active IMPATT multiplier module 5 (at multiplication factor N=10) enables a single-stage multiplier circuit to be realized. This makes the transceiver construction much simpler and reduces the number of elements in the circuit, thus making it more reliable and much less expensive. The output signal from the transmitter active IMPATT multiplier module 5 is directed to the transmit antenna 1.

The receiver is made as a heterodyne circuit with double frequency conversion. An echo-signal comes to a first balance mixer 7 via the receive antenna 2. The power source of the first heterodyne is also the active IMPATT frequency multiplier module 6 (with frequency multiplication factor N=11) employing the same silicon IMPATT diode as in the transmitter IMPATT multiplier module 5. The heterodyne active IMPATT multiplier module 6 provides the heterodyne power (required for the first balance mixer 7) no less than 10 mW in the 83.6-84.7 GHz frequency range. The required linearity, frequency tuning rate and phase noise level for the radiated signal of the first heterodyne are determined by the parameters of the same low-frequency VCO 4 at 7.6-7.7 GHz. The first intermediate frequency (IF) signal derived from the output of the first balance mixer 7 is amplified by a low-noise first IF amplifier 8. The second frequency conversion occurs in the second balance mixer 9. The second IF signal obtained at the output of the second balance mixer 9 is amplified by the second IF amplifier 10. For the second heterodyne, the signal from the low-frequency VCO 4 at 7.6-7.7 GHz is used. This construction of the receiver provides the noise factor of the receiver transmission line of 10-12 dB. Employing the balance mixers in the receiver design provides the required degree of suppression of the heterodyne amplitude modulated (AM) noise.

The signal reflected from the target and radiated probing signal of sweeping frequency are mixed at balance mixers 7 and 9 to extract a beat-frequency signal that comes to the processing unit 11. The processor 11 determines, with high accuracy, the distance to the target from the results of analysis of the beat-frequency spectrum.

In a modified embodiment, the transceiver power source is the transmitter active frequency multiplier module 5 wherein a higher multiplication factor (N=30) is used. In this case, the active IMPATT multiplier module 5 provides formation of a radar probing signal with power no less than 30 mW in the 76-77 GHz frequency range. The required linearity, frequency tuning rate and phase noise level for the radiated probing signal are determined by the parameters of the low-frequency VCO 4 operating at about 2.53-2.56 GHz, or even 2.5 GHz. It is likely that an increase of FM noise during multiplication with such a silicon IMPATT frequency multiplier does not exceed 20 log N at about 10-100 kHz offset from the carrier. High conversion efficiency of the active IMPATT multiplier module 5 (at multiplication factor N=30) enables a single-stage multiplier circuit to be realized.

1.2 Transmitter Active IMPATT Multiplier Module

The transmitter active IMPATT frequency multiplier module 5 (whose block diagram is shown in FIG. 1) is a hybrid IC (HIC) involving an input transistor power amplifier 12 operating at 7.6-7.7 GHz, active IMPATT frequency multiplier 13 (with frequency multiplication factor N=10) constructed on a silicon multiplying IMPATT diode 22 (see FIG. 2), bandpass filter 14, as well as voltage regulator 15 for transistors and DC bias current regulator 16 for the IMPATT diode 22. The transmitter module 5 is located in a single metal housing with the coaxial input and waveguide output (waveguide size WR-10). The supply voltages are applied to the transmitter module 5 via feed-through insulators.

The FM signal at 7.6-7.7 GHz (power of 20 mW) from the VCO 4 enters the input of the transistor power amplifier 12 via a coaxial connector. The gain of the transistor power amplifier 12 operating at 7.6-7.7 GHz is +17 dB. Two balanced stages (connected in series) operate in the saturation mode; they provide microwave power of 1 W at the output of the power amplifier 12. In a simple case, such an amplifier may be realized (as in a preferred embodiment of the invention) by utilizing microstrip technology in combination with GaAs field-effect transistors. It is apparent to those skilled in the art, however, that a monolithic or any other circuit with the same parameters (frequency range, gain and power output) may be applied in construction of such an amplifier.

The output signal at 7.6-7.7 GHz from the transistor power amplifier 12 enters the multiplying IMPATT diode 22 of the active IMPATT frequency multiplier 13. The silicon IMPATT diode 22 (that was designed purposely for the 76-77 GHz frequency range) operates in the avalanche breakdown mode. To realize frequency multiplication, strong avalanche nonlinearity (of inductive nature) is used. High (13 dB) conversion efficiency is determined by the fact that this silicon IMPATT diode has negative resistance at the required $10^{th}$ harmonic of input signal.

Figure 3:
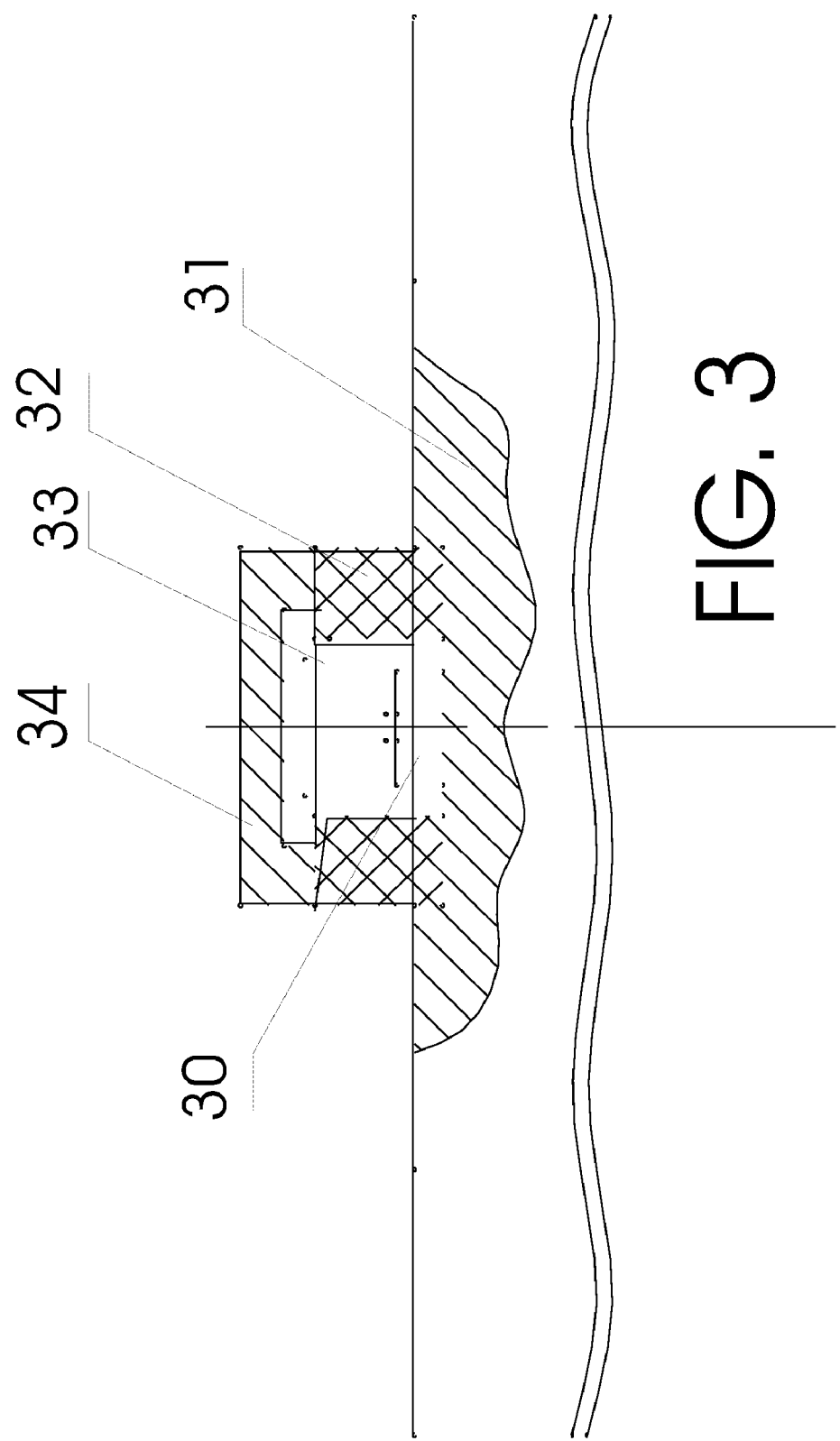
FIG. 3 shows schematically cross-section of a packaged Si multiplier IMPATT diode optimized for the 76-77 GHz range according to the hybrid integrated-waveguide preferred embodiment.

The silicon IMPATT diode 22 has a single-drift $p^+$-n-$n^+$ structure. It is made using the traditional manufacturing technology [see, N. S. Boltovets, V. V. Basanets, V. N. Ivanov et al., Microwave diodes with contact metallization systems based on silicides, nitrides and borides of refractory metals, Semiconductor Physics, Quantum Electronics & Optoelectronics, 2000, vol. 3, no. 3, pp. 359-370]. The starting material for production of the multiplying diode 22 may be a VPE-grown n-$n^+$-Si wafer. During the process of epitaxy an n-Si layer (thickness of 0.7 μm, impurity concentration of $3\times10^{16}$ cm$^{-3}$) is grown on a low-resistance (resistivity of 0.002 Ω×cm) As-doped $n^+$-Si substrate. Typical technological processes (diffusion, chemical etching, vacuum sputtering, photolithography, plating of copper and gold, etc.) are applied to make of a silicon wafer reverse diode mesas on an integral copper heat sink (IMPATT diode chips) using the batch-fabrication technique. Then, the mesas are separated, and each IMPATT chip 30 is mounted on a gold-plated copper cylindrical heat sink base 31 inside a dielectric bush 32 (see FIG. 3). The $p^+$-contact of the IMPATT diode 22 is connected to the gold-plated copper heat sink base 31, while the $n^+$-contact is connected to the metallized face of the dielectric bush 32 via a gold multipetal lead 33. The dielectric bush 32 is capped with a gold-plated metal cap 34.

It should be noted that formation of a multiplying IMPATT diode according to this invention is made using the standard manufacturing technology for silicon discrete microwave diodes and ICs; no development of additional specific technological processes is required. High degree of maturity of silicon technologies (used for growing semiconductor silicon material and production of devices on its basis) provides achieving reproducibly the required parameters at MM-wave frequencies and makes it possible to realize them under mass production conditions. This fact, along with the advantages of the single-stage multiplication circuit implemented in a preferred embodiment of the invention, makes the transceiver more reliable and less expensive.

It is known from S. M. Sze, Physics of Semiconductor Devices, Second Edition, John Wiley & Sons, Inc., New York-Chichester-Brisbane-Toronto-Singapore (1981), Vol. 2, Chapter 10, that the operating frequency and efficiency of an IMPATT diode operation at that frequency are determined by the parameters of the diode structure and mounting construction. Therefore a big number of the diode parameters had to be optimized, such as the drift length (i.e., the n-layer thickness), mesa cross section area, breakdown voltage, direct current density, capacitance and inductance of the mounting elements, etc. For silicon multiplying IMPATT diodes operating in the 76-77 GHz frequency range the main parameter values after optimization are as follows: impurity concentration in the n-layer of $3\times10^{16}$ cm$^{-3}$, n-layer thickness of 0.35 μm, mesa diameter of 40-50 μm, with the resonance frequency in the 76-77 GHz range.

Figure 2:
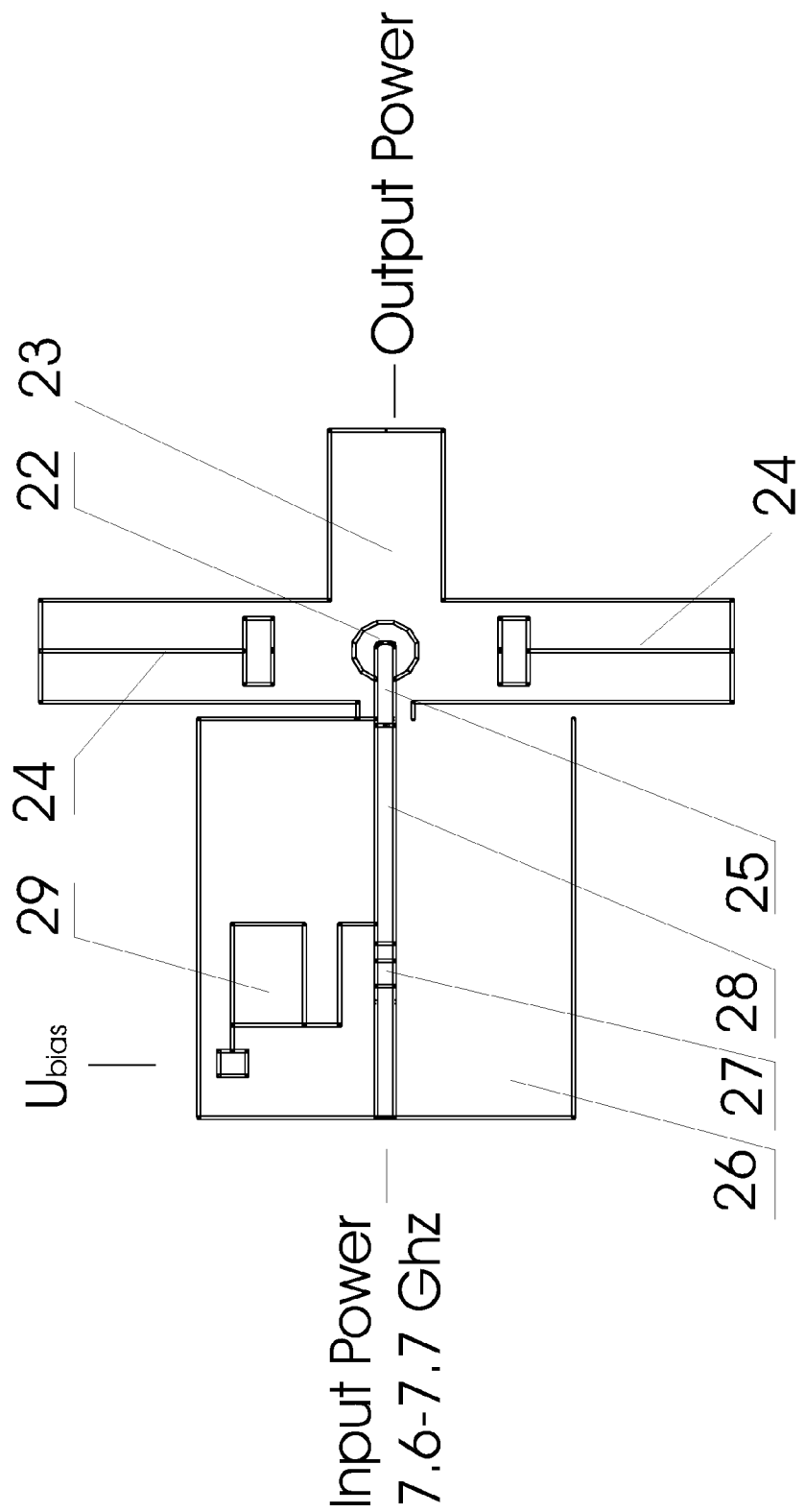
FIG. 2 shows the circuit for matching the multiplier IMPATT diode of FIG. 3 both with waveguide and microstrip transmission lines according to the hybrid integrated-waveguide preferred embodiment.

Considering the operation of the transmitter active IMPATT multiplier module 5, taking into account FIG. 1 and FIG. 2, matching between the multiplying IMPATT diode 22 and transistor amplifier 12 is performed by a microstrip board 26. The synchronizing signal from the transistor power amplifier 12 goes via a microstrip line 28 segment to the silicon IMPATT diode 22. A DC bias is applied to the diode 22 from the current regulator 16 via the above microstrip line 28 segment. The isolation between the IMPATT diode 22 DC bias voltage and the AC signal at 7.6-7.7 GHz from the transistor power amplifier 12 is achieved due to a filter 29 (included in the circuit of DC bias supply of the IMPATT diode 22) and a capacitance 27 (inserted in the break of the microstrip line 28). The IMPATT diode 22 is connected to the microstrip line 28 with a gold-plated strap 25.

The silicon IMPATT diode 22 (operating in the avalanche breakdown mode when its characteristic is nonlinear) converts the input synchronizing signal to cause harmonics multiple to the input signal frequency to appear in the frequency spectrum. To separate the required $10^{th}$ harmonic of the input signal, the IMPATT diode 22 is placed within an output coupling circuit made as a T-shaped waveguide tee 23 (FIG. 2). Referring to FIG. 2, arranged in two opposite arms of the waveguide tee 23 are tuning shorts 24, while the third arm of the waveguide tee 23 serves for the microwave energy output. The waveguide tee 23 has waveguide size WR-10. At the output of the waveguide tee 23, there is a waveguide bandpass filter 14 (see FIG. 1) whose pass band is 75.5-77.5 GHz. Filter 14 efficiently suppresses the adjacent harmonics. The proposed circuit provides maximal efficiency of the multiplying IMPATT diode matching with both the microstrip line and waveguide transmission line. In addition, it provides efficient heat removal from the diode and supply of DC bias required for IMPATT diode operation. The circuit shown in FIG. 2 enables one to use the off-the-shelf discrete multiplying IMPATT diodes, provides easy assembling of the transmitter module 5 and high mechanical strength of the module 5 as a whole. The output signal (at 76-77 GHz, power of 30-50 mW) from the transmitter active IMPATT multiplier module 5 comes via the waveguide output to the transmit antenna 1.

1.3 Heterodyne Active IMPATT Multiplier Module

The active IMPATT multiplier module 6 of the first heterodyne of the receiver is also a HIC involving an input transistor power amplifier 17 operating at 7.6-7.7 GHz, active CW IMPATT frequency multiplier 18 (with multiplication factor N=11) constructed on a silicon multiplying IMPATT diode similar to the IMPATT diode 22 (shown in FIG. 2 for the IMPATT multiplier module 5), bandpass filter 19, voltage regulator 20 for transistors and DC bias current regulator 21 for the IMPATT diode. The heterodyne module 6 is located in a single metal housing with the coaxial input and waveguide output (waveguide size WR-10). The supply voltages come to the transmitter module 6 via feed-through insulators.

The FM signal (at 7.6-7.7 GHz, power of 20 mW) from VCO 4 goes via a coaxial connector to the input of the transistor power amplifier 17 (operating at 7.6-7.7 GHz, with gain of +14 dB). Two balanced amplifier stages connected in series operate in the saturation mode. They provide microwave power of 0.5 W at the output of the power amplifier 17. In one case, such an amplifier may be realized (as in a preferred embodiment of the invention) by utilizing microstrip technology in combination with GaAs field-effect transistors. It is apparent to those skilled in the art, however, that in construction of such amplifier one can apply a monolithic or any other circuit with the same parameters (frequency range, gain and power output).

The output signal from the transistor power amplifier 17 is directed to the silicon multiplying IMPATT diode of the active IMPATT frequency multiplier 18. Matching between the multiplying IMPATT diode and transistor amplifier 17 is performed with a microstrip board 26 in a manner similar to that for the transmitter IMPATT multiplier module 5. This IMPATT diode is coupled into the waveguide by the T-shaped waveguide tee 23, similarly as for transmitter module 5. In contrast to transmitter module 5, in the heterodyne module 6, the $11^{th}$ (rather than $10^{th}$) input signal harmonic is separated. At the output of the T-shaped waveguide tee 23, there is a waveguide bandpass filter 19 (see FIG. 1) whose pass band is 83.1-85.2 GHz. It efficiently suppresses the adjacent harmonics, as well as considerably reduces AM noise of the heterodyne module 6 at the frequency of echo-signal reception (by over 60 dB). The output signal (at 83.6-84.7 GHz, with power of no less than 10 mW) from the heterodyne active IMPATT multiplier module 6 is directed via the waveguide output to the heterodyne input of the balance mixer 7.

Figure 4:
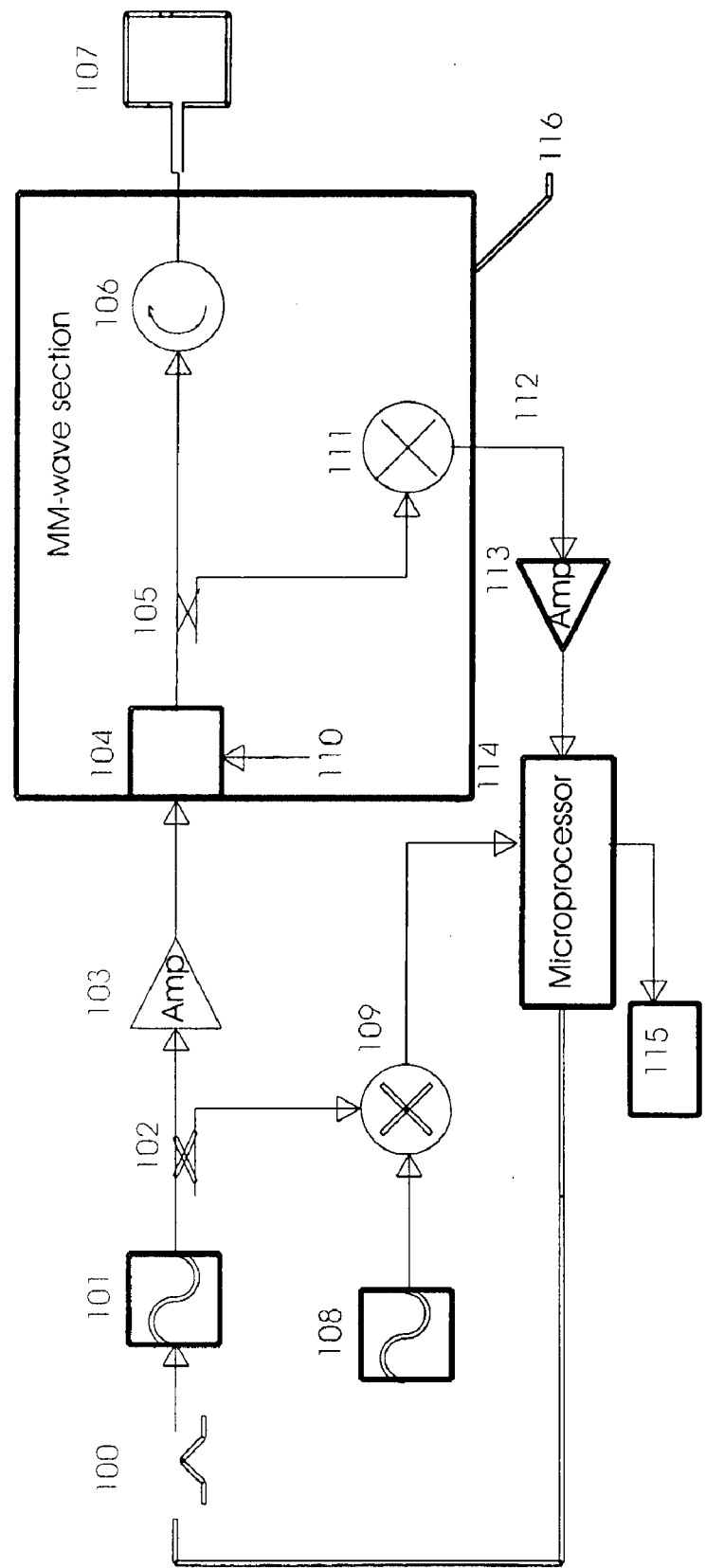
FIG. 4 shows a block diagram of the 76-77 GHz FMCW radar transceiver with one antenna according to the hybrid integrated-microstrip embodiment of the invention.

2. Hybrid Integrated Microstrip Radar Transceiver with One Antenna 2.1 General Description of Hybrid Integrated Microstrip Transceiver with One Antenna FIG. 4 shows schematically a transceiver (realized and tested) intended for operation as a front-end of automotive radar with operating frequency in the 76-77 GHz frequency range. The transceiver is a homodyne circuit with linear frequency modulation; it operates with a single transmit/receive antenna. In this embodiment, a MM-wave section 116 of the transceiver is made (using the hybrid-integrated microstrip technology) on a high-resistance silicon substrate. A silicon multiplying IMPATT diode (optimized for the operating frequency of 76-77 GHz) is used as an active element in the receiver section of the transceiver. Application of the hybrid-integrated technology, as well as use of a silicon substrate and one active element (silicon IMPATT diode) makes it possible to considerably reduce the size and mass of the transceiver and improve both its service life and reliability. Under the series production conditions, high reproducibility of operating parameters is provided, as well as possibility to produce low-cost automotive radars with the required level of specifications.

The transceiver operates in the following manner. The sweep voltage 100 goes from a microprocessor unit 114 to a VCO 101 (tuning range of 7.6-7.7 GHz, power output of 7-8 mW). A signal from the VCO 101 goes to a directional coupler 102 and is divided therein in two parts. One part of the signal enters the input of an amplifier 103. Another part of the signal from the directional coupler 102 is directed to a mixer 109. A signal from an oscillator 108 (stabilized with a dielectric resonator, DRO) is directed to the LO input of the mixer 109. In the mixer 109, the signals from the VCO 101 and DRO 108 are converted into the IF signal of the mixer 109. The IF signal is provided to the microprocessor unit 114 where a digital phase-locked-loop frequency control system is included. It provides high linearity of the VCO 101 frequency tuning and improves the VCO 101 spectral characteristics.

After amplification by the oscillator 103, the signal comes to the active frequency multiplier 104 with high multiplication factor. The IMPATT diode bias current feeds the input 110 of the frequency multiplier 104. The $10^{th}$ harmonic of the signal coming from the amplifier 103 is separated in the multiplier 104 by means of matching-transforming circuits (MTC). The frequency of the output signal of the multiplier 104 varies in the 76-77 GHz range; the power output is about 15 mW. The signal converted in the multiplier 104 is provided to a directional coupler 105 and is divided therein into two portions. One portion of the signal via a microstrip circulator 106 feeds an antenna 107 and is radiated into space. A signal reflected from an object is received by the same antenna 107 and is directed (via the circulator 106) to a mixer 111. The required isolation level is provided in the circulator 106. Another portion of the signal from the directional coupler 105 enters the LO input of the mixer 111. The hybrid-integrated mixer 111 is a balanced circuit. This provides suppression of the LO noise. At the mixer output 112, the IF signal of the mixer 111 (proportional to the difference between the radiated signal and that reflected from an object) is extracted. This signal is amplified by a low-noise amplifier 113 and is provided to the microprocessor unit 114 for processing and obtaining a signal that is proportional to the velocity and distance to the object. Then, the signal is displayed on an indicator 115.

Figure 5:
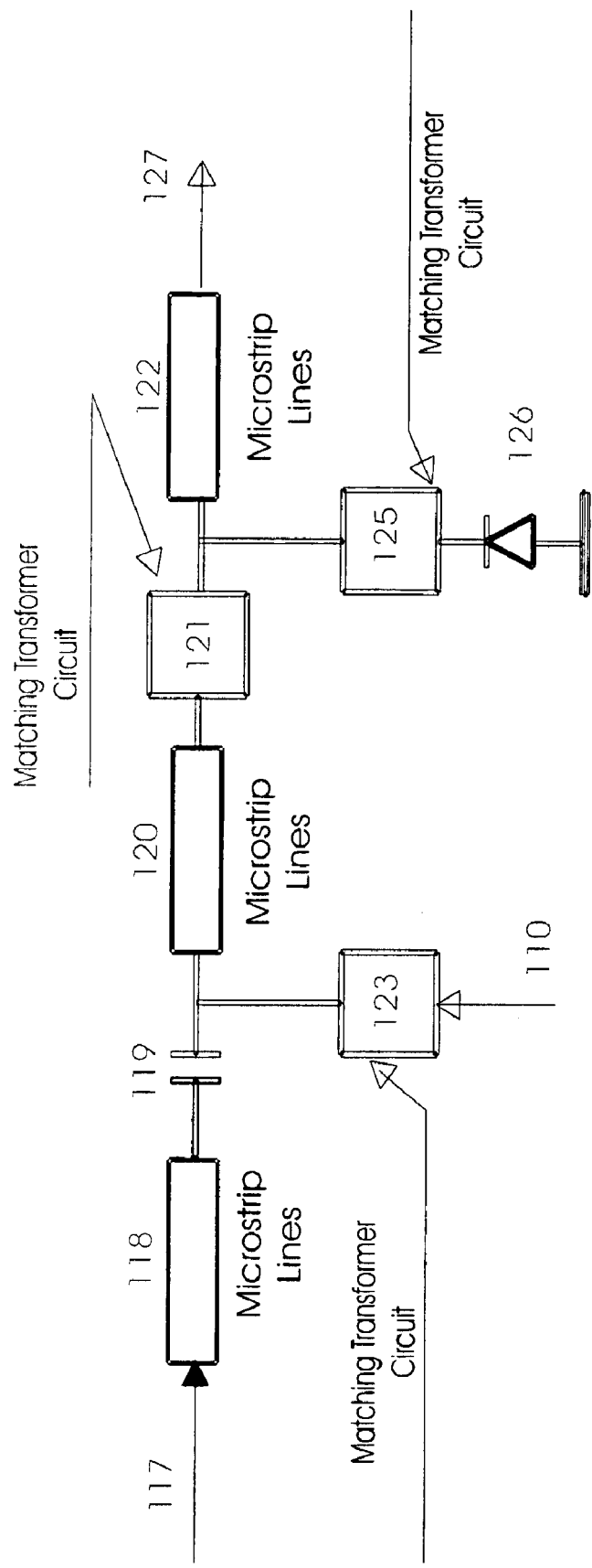
FIG. 5 shows a block diagram of the 76-77 GHz active silicon IMPATT frequency multiplier according to the hybrid integrated-microstrip embodiment of the invention.

2.2 Block-diagram of the Hybrid Integrated Microstrip Active Frequency Multiplier The schematic of the hybrid-integrated frequency multiplier 104 implemented in accordance with this preferred embodiment of the invention is shown in FIG. 5. The hybrid integrated-microstrip frequency multiplier 104 includes a decoupling capacitor 119, MTCs 121, 123 and 125, microstrip lines 118, 120 and 122 and a silicon multiplying IMPATT diode chip 126 which is similar to the multiplying IMPATT diode chip 30 shown in FIG. 3 for the hybrid. integrated-waveguide embodiment. The signal of low (7.6-7.7 GHz) frequency is provided to the multiplying IMPATT diode chip 126 via the decoupling capacitor 119, microstrip line 120, MTC 121 and MTC 125. The $10^{th}$ harmonic signal at 76-77 GHz is extracted with the MTC 125 and is provided via the microstrip line 122 to the output 127 of the frequency multiplier 104. The IMPATT diode chip 126 is supplied with a DC bias current via the MTC 123.

2.3 Layout of the MM-Wave Section of the Hybrid Integrated Microstrip Transceiver The MM-wave section of the transceiver is shown enclosed by a dashed line box 116 in FIG. 4. This section 116 size is 10.5×3.8 mm; it is made on the high-resistance substrates whose thickness is no more than 120 μm.

The substrates are made of high-resistance (resistivity no less than $10^3$ Ohm×cm) silicon. On standardized silicon wafers membranes of required thickness (no more than 120 μm) are formed. They serve for formation of passive components of microwave IC chips using the standard microelectronic techniques.

Figure 6:
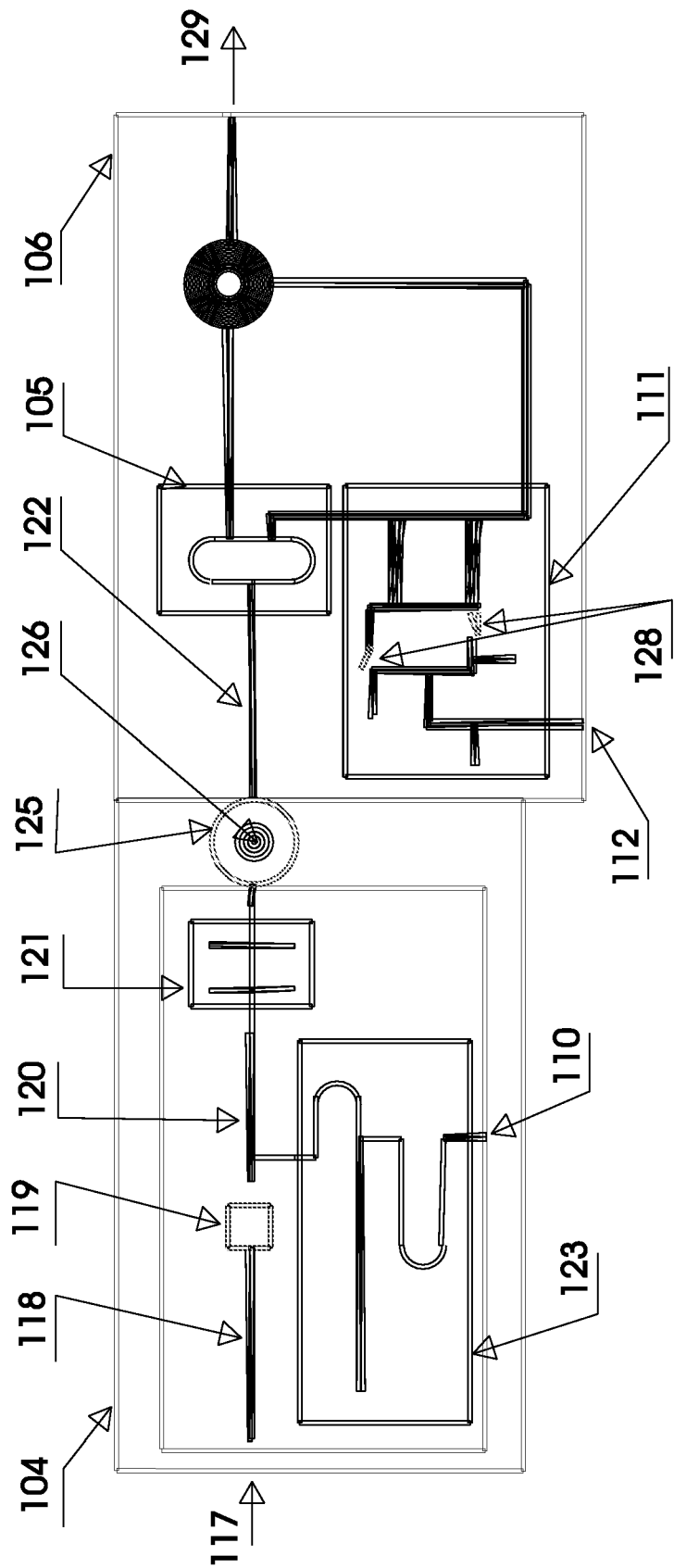
FIG. 6 shows the layout of the MM-wave section of the 76-77 GHz FMCW radar transceiver according to the hybrid integrated-microstrip embodiment of the invention.

The layout of the transceiver MM-wave section 116 is shown in FIG. 6. The low-frequency (7.6-7.7 GHz) signal enters the input 117. The multiplying diode DC bias current feeds the input 110. The MTC 123 excludes the effect of the IMPATT diode bias current circuitry on propagation of the low-frequency signals via the microstrip line 120. The MTC 123 is a stub microstrip band-rejection filter designed for the frequency of 7.6-7.7 GHz.

The MTC 121 gates low-frequency signals and rejects the multiplying diode $10^{th}$ harmonic signal. The MTC 121 is a stub microstrip band-rejection filter designed for the frequency 76-77 GHz. The MTC 125 transforms the impedance of the IMPATT diode chip 126 in the 76-77 GHz frequency range. The MTC 125 comprises construction elements of a miniature diode package, i.e., a dielectric bush and a gold many-petal lead. The gold many-petal lead (or multi-petal lead) forms the transformer inductance, while the dielectric bush forms its capacitance. Similar to the multiplying IMPATT diode chip 30 shown in FIG. 3, the multiplying IMPATT diode chip 126 comprises a silicon reverse $p^+$-n-$n^+$ mesa and a gold-plated copper heat sink base. The diode chip 126 parameters are optimized in the 76-77 GHz frequency range. The MTC 125 resonance frequency lies in the 76-77 GHz range.

The stub microstrip directional coupler 105 sends part of the signal to the circulator 106 and another part to the LO input of the mixer 111. The mixer 111 is a balanced circuit employing beam-lead GaAs diodes 128. It provides the conversion coefficient better than 10 dB. The arm 129 of the circulator 106 is connected to the microstrip antenna 107.

3. Vehicular Implementation

In light of the foregoing, an automotive vehicle including the system described above would include a radar transceiver including a transmit antenna, a receive antenna separate and isolated from the transmit antenna, a frequency generator for generating a voltage pulse, a voltage-controlled oscillator (VCO) arranged to receive the voltage pulse from the frequency generator and generate a signal, a transmitter active IMPATT multiplier module arranged to receive the signal from the VCO and generate a radar probing signal which is directed to the transmit antenna, a heterodyne active IMPATT multiplier module arranged to receive the signal from the VCO, a first balance mixer arranged to receive the signal from the VCO, a second balance mixer arranged to receive a signal from the receive antenna and the heterodyne active IMPATT multiplier module and derive a first intermediate frequency (IF) signal, a first amplifier for amplifying the output of the second balance mixer and providing the amplifier output to the first balance mixer, and a second amplifier for amplifying the output of the first balance mixer.

A digital signal processor is coupled to the second amplifier and receives the output therefrom and generates a control signal for controlling a component in the vehicle based on the output from the second amplifier. For example, the component may be an adjustable collision avoidance device in which case, the processor might determine a distance between an object and the vehicle and control the collision avoidance based on the determined distance. A decreasing distance between the object and the vehicle would be indicative of a pending collision. The collision avoidance device might cause the steering wheel to be turned to avoid the accident, the brakes to be applied to avoid the accident.

Figure 7:
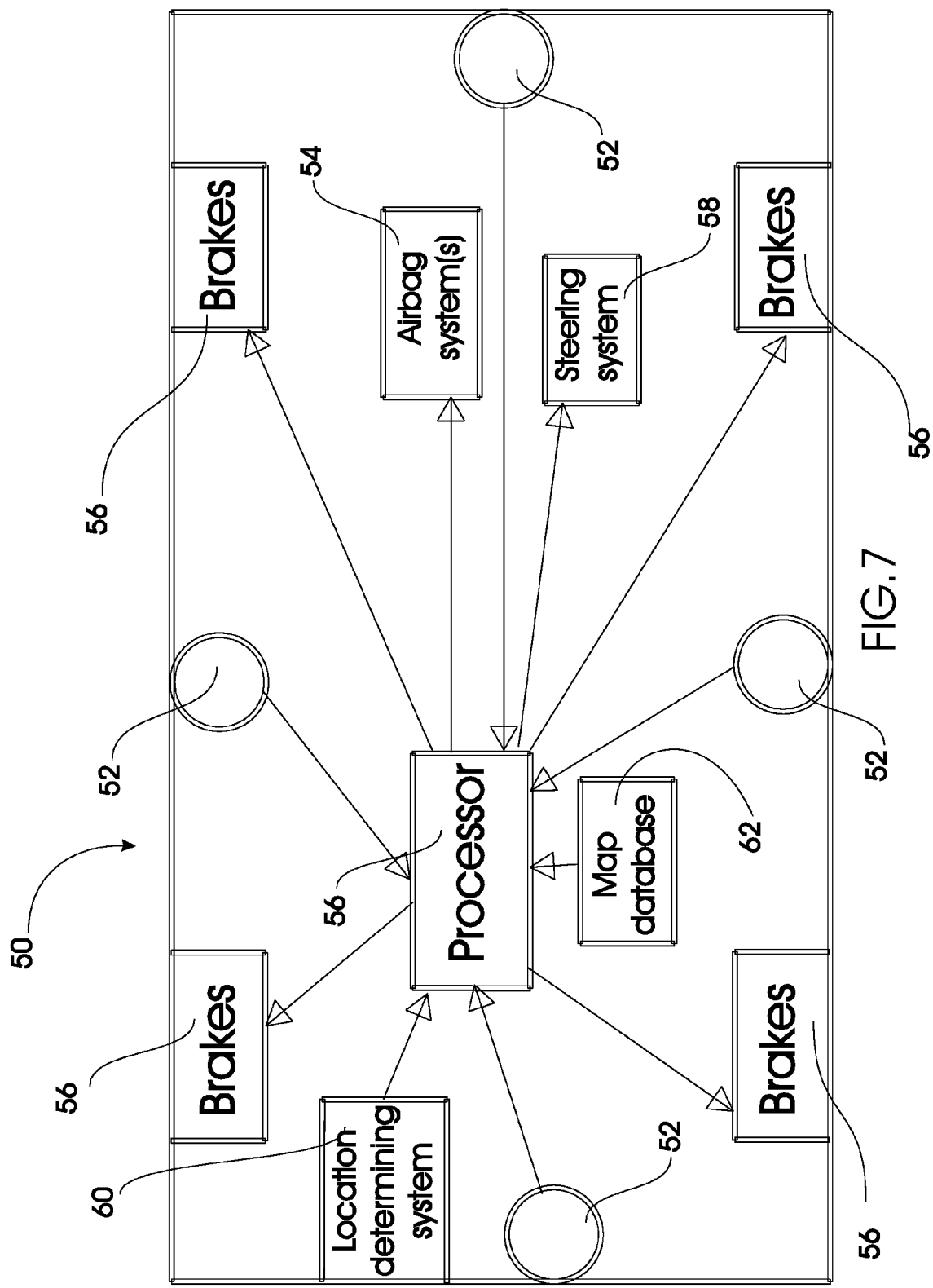
FIG. 7 is a schematic of a vehicle showing transceivers used for collision avoidance in accordance with the invention.

FIG. 7 is a schematic of a vehicle 50 showing a collision avoidance system in accordance with the invention. Vehicle 50 includes several radar transceivers 52, possibly one on each side of the vehicle 50 as shown, and all of which are coupled to a processor 54. Processor 54 is also coupled to adjustable components in the vehicle such as brakes 56 associated with each tire of the vehicle 50 and a steering system 58 connected to the steering wheel, steering shaft and/or steering axle of the vehicle 50. Processor 54 includes a collision avoidance program which obtains input from the transceivers 52 and based thereon, provides output to the brakes 56 and/or steering system 58 as needed. Processor 54 can also be coupled to a location determining system 60 which determines the location of the vehicle and a map database 62 which correlates the position of the vehicle 50 to a road on which the vehicle 50 is traveling.

In operation to avoid collisions, when data derived from the signals from transceivers 52 is received and is indicative of the possibility of a collision as determined by processor 54, preferably in consideration of the location of the vehicle 50 as determined by the location determining system 60 and the road on which the vehicle 50 is traveling as provided by the map database 62, processor 54 determines an appropriate manner to adjust the travel of the vehicle 50. Adjustment of the travel of the vehicle 50 may entail applying brakes 52 to slow the vehicle or otherwise changing the speed of travel of the vehicle (accelerating), changing the direction of travel of the vehicle via control of the steering system 58 or a combination thereof.

Instead of or in addition to a collision avoidance device, the processor 54 could control one or more occupant protection devices (represented by airbag systems 64 in FIG. 7) to deploy the same or prepare the same for deployment in the event of a collision. Thus, transceivers 52, in combination with processor 54, could be used as an anticipatory sensor system which readies one or more airbag systems 64 for deployment and may actually deploy them prior to an impact involving the vehicle.

Figure 8:
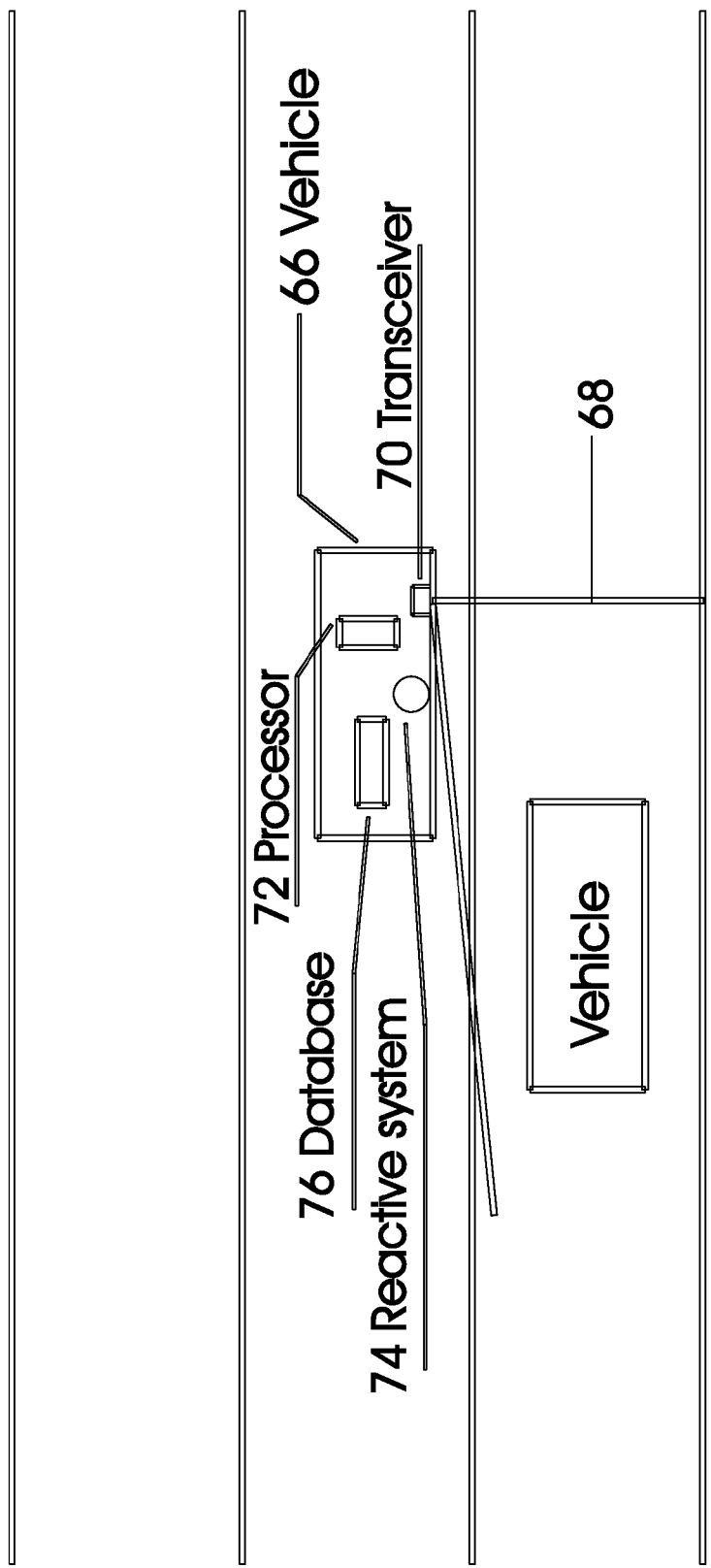
FIG. 8 is a schematic of a vehicle showing transceivers used for blind spot monitoring in accordance with the invention.

Another vehicular application for transceivers in accordance with the invention would be blind spot monitoring. As shown in FIG. 8, a vehicle 66 frequently if not always is driven in such a manner to cause the presence of blind spots, spots not in the viewing range of the driver either directly or through the use of mirrors. One such blind spot is defined by boundary lines 68. To alert the driver to the presence of, for example, another vehicle in the blind spot, a system in accordance with the invention includes one or more transceivers 70 arranged on the vehicle and in a position to direct radar waves into the blind spot and receive reflected radar waves from any objects in the blind spot.

Each transceiver 70 is connected to a common processor 72 which in turn is connected to one or more reactive systems 74 in the vehicle 66. A reactive system 74 is one which will alert the driver, e.g., audibly, visually or both in combination, to the presence of another vehicle in the blind spot if the driver takes action to move his vehicle into the path of the other vehicle in the blind spot (to prevent a collision). The reactive system 74 could also be a display visible to the driver, in which the contents of the blind spot are displayed to the driver to enable him or her to make a decision about moving the vehicle.

Processor 72 can be programmed to apply pattern recognition techniques to identify the objects in the blind spot. Processor 72 can also be designed to correlate with a database 76 of road structures to avoid alerting the driver to objects which are properly in the blind spot as well as to factor in the path of the road on which the vehicle is traveling when defining the blind spot of the vehicle.

Other vehicular applications in which transceivers described above may be used include automatic cruise control and precise positioning system.

Although several preferred embodiments are illustrated and described above, there are possible combinations using other geometries, sensors, materials and different dimensions for the components that perform the same functions. This invention is not limited to the above embodiments and should be determined by the following claims

We claim:

1. An automotive radar transceiver, comprising:
a transmit antenna;
a receive antenna separate and isolated from said transmit antenna;
a frequency generator for generating a voltage pulse;
a voltage-controlled oscillator (VCO) arranged to receive the voltage pulse from said frequency generator and generate a signal;
a transmitter active IMPATT multiplier module arranged to receive the signal from said VCO and generate a radar probing signal which is directed to said transmit antenna;
a heterodyne active IMPATT multiplier module arranged to receive the signal from said VCO;
a first balance mixer arranged to receive the signal from the VCO;
a second balance mixer arranged to receive a signal from said receive antenna and said heterodyne active IMPATT multiplier module and derive a first intermediate frequency (IF) signal;
a first amplifier for amplifying the output of said second balance mixer and providing the amplifier output to said first balance mixer; and
a second amplifier for amplifying the output of said first balance mixer,
whereby analysis of the signal transmitted by said transmit antenna and the signal received by said receive antenna provides information for use in the vehicle.

2. The transceiver of claim 1, wherein said frequency generator is arranged to generate a symmetric saw-tooth voltage.

3. The transceiver of claim 1, wherein said VCO is arranged to generate a frequency-modulated signal.

4. The transceiver of claim 1, wherein said VCO includes a bipolar transistor to reduce phase noise in the generated signal.

5. The transceiver of claim 1, wherein said heterodyne active IMPATT multiplier module includes a silicon IMPATT diode.

6. The transceiver of claim 5, wherein said silicon IMPATT diode is arranged to form a radar probing signal with power no less than 30 mW in the 76-77 GHz frequency range.

7. The transceiver of claim 6, wherein the required linearity, frequency tuning rate and phase noise level for the probing signal are determined by the parameters of said VCO operating at 7.6-7.7 GHz.

8. The transceiver of claim 1, wherein said transmitter active IMPATT multiplier module includes an input transistor power amplifier arranged to receive the signal generated by said VCO, an active IMPATT frequency multiplier following said power amplifier, a bandpass filter following said frequency multiplier, a voltage regulator for regulating said power amplifier and a current regulator for regulating said frequency multiplier.

9. The transceiver of claim 8, wherein said frequency multiplier has a frequency multiplication factor of 10 and is constructed on a silicon multiplying IMPATT diode.

10. The transceiver of claim 1, wherein said heterodyne active IMPATT multiplier module includes an input transistor power amplifier arranged to receive the signal generated by said VCO, an active CW IMPATT frequency multiplier following said power amplifier, a bandpass filter following said frequency multiplier, a voltage regulator for regulating said power amplifier and a current regulator for regulating said frequency multiplier.

11. The transceiver of claim 10, wherein said frequency multiplier has a frequency multiplication factor of 11 and is constructed on a silicon multiplying IMPATT diode.

12. A method for generating and processing radar signals for vehicular uses, comprising:
providing a transmit antenna and a receive antenna separate and isolated from the transmit antenna on a vehicle;
directing a voltage pulse to a voltage-controlled oscillator (VCO) which generates a signal;
dividing the signal from the VCO into three signals and directing the divided signals to a transmitter active IMPATT multiplier module arranged having a multiplication factor of 30 and providing a radar probing signal in a 76-77 GHz frequency range, to a heterodyne active IMPATT multiplier module and to a first balance mixer;
directing an output signal from the transmitter active IMPATT multiplier module to the transmit antenna;
directing a signal from the receive antenna and a signal from the heterodyne active IMPATT multiplier module to a second balance mixer which derives a first intermediate frequency (IF) signal;
amplifying the output of the second balance mixer and providing the amplified output to the first balance mixer; and
amplifying the output of the first balance mixer to form a usable signal.

13. The method of claim 12, further comprising determining the required linearity, frequency tuning rate and phase noise level for the signal transmitted by the transmit antenna based on parameters of the VCO.

14. The method of claim 12, wherein the processing of the radar signal entails determining the distance between the transmit antenna and an object based on analysis of the transmitted signal and the received signal.

15. An automotive vehicle, comprising:
a radar transceiver including
a transmit antenna;
a receive antenna separate and isolated from said transmit antenna;
a frequency generator for generating a voltage pulse;
a voltage-controlled oscillator (VCO) arranged to receive the voltage pulse from said frequency generator and generate a signal;
a transmitter active IMPATT multiplier module arranged to receive the signal from said VCO and generate a radar probing signal which is directed to said transmit antenna;
a heterodyne active IMPATT multiplier module arranged to receive the signal from said VCO;
a first balance mixer arranged to receive the signal from said VCO;
a second balance mixer arranged to receive a signal from said receive antenna and said heterodyne active IMPATT multiplier module and derive a first intermediate frequency (IF) signal;
a first amplifier for amplifying the output of said second balance mixer and providing the amplifier output to said first balance mixer; and
a second amplifier for amplifying the output of said first balance mixer; and
a processor arranged to receive the output from said second amplifier and generate a control signal for controlling a component in the vehicle based on the output from said second amplifier.

16. The vehicle of claim 15, wherein said component is one of brakes and a steering system and said processor is arranged to determine a distance between an object and the vehicle and control said brakes or said steering system based on the determined distance between the object and the vehicle.

17. The vehicle of claim 15, wherein said transceiver is arranged to direct radar waves into a blind spot of the vehicle, further comprising a reactive system coupled to said processor, said processor generating a control signal to control said reactive system to provide information to the driver about the presence of objects in the blind spot.

18. The vehicle of claim 17, wherein said reactive system is an alarm system for audibly or visually notifying the driver of the presence of a vehicle in the blind spot.

19. The vehicle of claim 15, further comprising a database containing information about roads on which the vehicle travels, said processor being coupled to said map database for controlling the component based in part on the road on which the vehicle is traveling.

20. The vehicle of claim 15, further comprising a location determining system for determining the location of the vehicle on which the vehicle travels, said processor being coupled to said location determining system for controlling the component based in part on the location of the vehicle.

* * * * *

UNITED STATES PATENT AND TRADEMARK OFFICE
CERTIFICATE OF CORRECTION

| | |
|---|---|
| PATENT NO. | : 7,324,039 B2 |
| APPLICATION NO. | : 11/304502 |
| DATED | : January 29, 2008 |
| INVENTOR(S) | : Nikolai S. Boltovets et al. |

It is certified that error appears in the above-identified patent and that said Letters Patent is hereby corrected as shown below:

Column 2, line 17, change "modem" to --modern--.

Signed and Sealed this

Twentieth Day of May, 2008

JON W. DUDAS
*Director of the United States Patent and Trademark Office*